May 16, 1939.

J. M. HAIT 2,158,696

PUMP LUBRICATING APPARATUS

Filed Sept. 25, 1935

INVENTOR.
James. M. Hait.
BY Philip A. Minnis
ATTORNEY.

Patented May 16, 1939

2,158,696

UNITED STATES PATENT OFFICE 2,158,696

PUMP LUBRICATING APPARATUS

James M. Hait, San Marino, Calif., assignor to Food Machinery Corporation, San Jose, Calif., a corporation of Delaware Application September 25, 1935, Serial No. 41,997

5 Claims. (Cl. 103—102)

This invention relates to deep well pumps, and is particularly concerned with the provision of an automatically actuable oiling system for lubricating the line shaft bearings.

These line shaft bearings require proper lubrication during operation of the pump, although during periods of idleness it is desirable to interrupt the supply of oil to them in order to avoid useless waste of oil and to minimize the frequency of attention required to insure that the oil supply does not become exhausted. Consequently, lubrication of the bearings is commonly controlled by the employment of automatic lubricating devices, responsive to the pump operation so as to deliver oil to the bearings during operative periods, and to interrupt the supply of oil when the pump is shut down.

Among the problems encountered in the operation of such lubricating devices is that of insuring reliable operation under varying temperature conditions. For example, they are frequently required to operate under freezing weather conditions, and it is one of the objects of the present invention to provide an automatic lubricating device for use in connection with deep well pumps and which can be relied upon for proper operation under freezing temperatures.

More specifically, it is an object to provide an oiling system for deep well pumps which functions automatically in response to water being pumped, yet remains entirely operative under freezing conditions.

Various further objects and advantages of the present invention will best be understood from a description of a preferred form of pumping mechanism embodying the invention. For this purpose reference is made to the accompanying drawing, in which.

Figure 1:
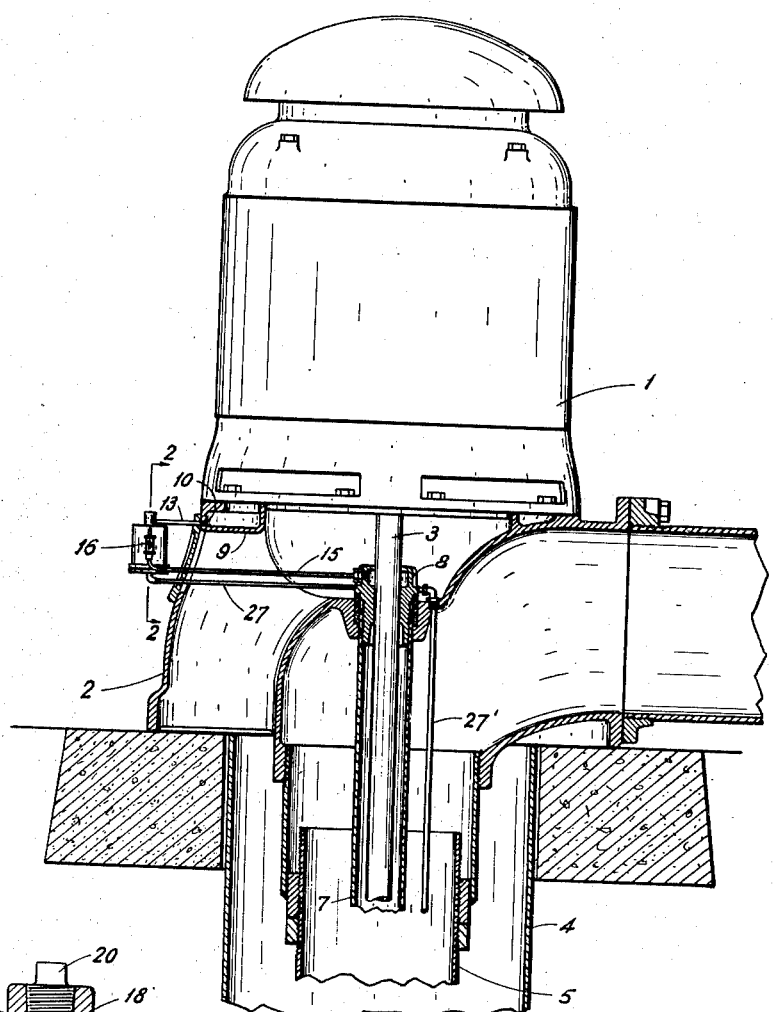
Figure 1 is a sectional elevation of a deep well pump head having a preferred form of oiling system embodying the present invention associated therewith.
Figure 2:
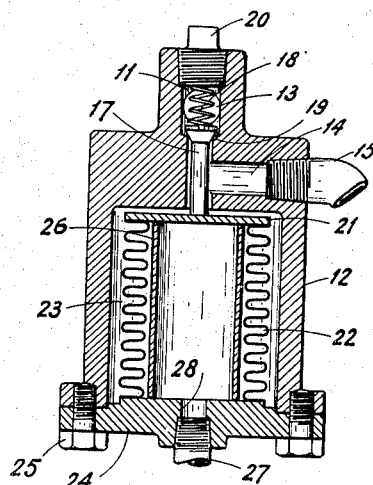
Figure 2 is a side elevation, taken along the line 2—2 of Figure 1, of the valve actuating mechanism, drawn to a larger scale.

The apparatus illustrated in the drawing comprises a pump head 1 supported upon a cast metal base or pedestal 2. A line shaft 3 extends downwardly from the pump head into the well formed by a well casing 4 and carries pump impellers (not shown) on its lower end, which, in operation, pump the liquid up through the discharge column 5 for discharge through the elbow 6 in the base casting 2. The shaft 3 is shielded from the water flowing through the column 5 by a protective tubing 7 which carries a series of spaced bearings 8, only the uppermost of which is illustrated, in which the line shaft is rotatably journalled.

The oiling system for supplying oil to the line shaft bearings includes an oil reservoir 9 preferably formed in the base 2. The reservoir 9 has an outlet 10 which communicates with a recess 11 within a valve housing 12 by means of a short pipe 13. A passageway 14 connects the recess 11 with a pipe 15 by which oil is conducted to the upper bearings 8 of the line shaft, from whence it drips downwardly through the protective tubing 7 to lubricate the bearings thereebeneath. The pipe 15 may be fitted with a sight glass 16 to visually indicate the flow of oil.

The flow of oil to the line shaft bearings is controlled by an inverted needle valve 17 which is normally held seated by means of a spring 18 upon a valve seat 19 formed in the recess 11. The spring 18 is seated against a plug 20 which is threaded into the valve housing 12 to permit regulation of the pressure exerted by the spring upon the needle valve so as to govern the rate of flow of the oil to the line shaft bearings during operation of the pump. The shank of the needle valve extends downwardly through the valve housing 12 and rests upon the end closure 21 of an expansion bellows 22 by which the valve is actuated.

The lower portion of the valve housing 12 forms a secondary chamber 23, which is closed by means of an end plate 24 secured to the valve housing by means of cap screws 25. Bellows 22 is securely sealed at one end to the end closure 21 and at the other end to the plate 24 so as to form an air tight enclosure. A guide cylinder 26 positioned within and concentrically of the bellows 22 prevents the walls of the latter from buckling when the bellows is contracted.

The interior of the bellows 22 communicates with the interior of the discharge column 5 by means of a horizontal open ended pipe 27 threaded into an opening 28 in the end plate 24 and extending thence to an air trap section 27' projecting downwardly into the discharge column 5, considerably below the discharge port. By this construction, upon operation of the pump, the rising liquid in the discharge column entraps the air in the trap section 27' and within the bellows 22, and as the liquid enters the lower end of the trap section 27' it compresses the air in the latter until the upward pressure of the liquid is equalized by the pressure exerted by the entrapped air. The air pressure thus created expands the bellows which in turn opens the needle valve 17.

The distance of water entry into trap 27' depends, inter alia, upon the total volume of air entrapped and the pressure of the water. If the total volume in pipe 27 is small and the section of pipe 27' within the discharge column of relatively large volume, comparatively small water travel into the pipe results in order to give the required bellows operating pressure.

It is preferable that the pipe 27 and trap section 27' be so proportioned that under no condition should the water enter thereinto to a point substantially outside the sphere of temperature influence of the water in the water column. It should be so constructed that the water never reaches the horizontal section of the pipe in order that all water entering shall drain away as soon as the pump stops, thus insuring that no water remains as to be subjected to freezing conditions. As illustrated, the pipe inside the water column is of sufficient diameter and length to insure that no water shall get beyond the column.

With a pipe so proportioned, any water in pipe 27' will always remain fluid because the pumped water will keep it from freezing by yielding heat to it. If water were allowed to move beyond the water column and in so doing move into the horizontal section of tube 27, it would quickly yield its heat to a cold casing, under cold winter conditions, and freeze. By this construction, only air is subjected to the very cold conditions. The water in the tube is entirely surrounded by water in fluid state to keep it from freezing.

The trapped air thus constitutes a very effective force transmitting medium, is not susceptible to freezing, and prevents water and accompanying sand and debris from entering the lubricant control system.

In the operation of the apparatus described, the reservoir 9 is first filled with oil, a portion of which flows through the pipe 13 into the recess 11 in the valve housing 12 and fills it to a level corresponding with that in the reservoir, escape of the oil through the passage 14 being prevented by the needle valve 17 which is normally held closed by the spring 18. When the pump is started the impellers pump the liquid up through the discharge column 5 and the rising liquid enters and rises in the open ended pipe 27' simultaneously as the liquid rises in the discharge column. The pressure of the air compressed in the pipe 27' by the flow of liquid is transmitted through the pipe 27 to the interior of bellows 22 and elevates the end closure member 21, thereby lifting the needle valve off its seat and permitting the oil in recess 11 to drain out into the pipe 15 and flow to the line shaft bearings.

When the pump stops and the liquid recedes in the discharge column, the open end of the pipe 27' relieves the compressed air within the bellows 22 to atmospheric pressure and permits the spring 18 to reseat the needle valve 17 thereby cutting off further supply of oil to the bearings until the pump is again started up.

It is believed that the construction and principle of operation of the apparatus embodying my invention will be apparent from the foregoing. Variations and modifications may be resorted to without departing from the spirit of the invention, as will be apparent to those skilled in the art, and I deem myself entitled to such modifications and variations as fall within the scope of the claims appended hereto.

Having now described my invention and in what manner the same may be used, what I claim as new and desire to protect by Letters Patent is:

1. In a deep well pump, a vertical line shaft, a bearing therefor, means for driving said shaft, a discharge column, an oil reservoir, a conduit for conducting oil from the reservoir to said bearing, a valve normally closing said conduit, a yieldable pressure responsive device associated with said valve for actuating the same, and means including a conduit extending into said discharge column for directing air pressure created by liquid rising in said discharge column to said pressure responsive device for actuating the latter to open said valve while maintaining any liquid forced into said conduit insulated from temperature conditions outside said pump.

2. In a deep well pump, a vertical line shaft, a bearing therefor, means for driving said shaft, a discharge column, oil supply means for said bearing, and a conduit connected to said oil supply means and extending into said discharge column into heat exchange relationship with liquid in said discharge column for applying air pressure created therein by liquid rising in said discharge column to cause said oil supply means to feed oil to said bearing while maintaining all liquid rising into said conduit within the zone of said heat exchange relationship.

3. In a deep well pump, a vertical line shaft, a bearing therefor, means for driving said shaft, a discharge column, an oil reservoir, a conduit for conducting oil from the reservoir to said bearing, a valve normally closing said conduit, means for opening said valve to permit oil to flow from the reservoir to the bearing, and control means for said valve opening means comprising a conduit for housing air and extending into said discharge column to subject the air in said conduit to the pressure of liquid rising in said discharge column while maintaining any liquid rising into said conduit in heat exchange relationship with liquid in said discharge column.

4. In combination, a deep well pump lubricating apparatus, and control means for said apparatus including a conduit for housing non-freezing pressure transmitting media and extending into the path of discharge water of the pump to subject said media to the pressure of said water and to insulate all water forced into said conduit from temperature conditions outside the pump by the heat exchange relationship thereof with said discharge water.

5. In a lubricating apparatus for a deep well pump having a discharge column, a valve for controlling the flow of lubricant, and a conduit for transmitting control forces to said valve and having a section extending downwardly in said discharge column, said section being constructed and arranged to maintain all water forced therein by the pressure of rising water in said discharge column in effective heat exchange relationship with said rising water.

JAMES M. HAIT.